US012647856B2

(12) United States Patent (10) Patent No.: US 12,647,856 B2
Zhu (45) Date of Patent: Jun. 2, 2026

(54) NETWORK SWITCHING METHOD, STORAGE MEDIUM AND ELECTRONIC DEVICE

(71) Applicant: JRD COMMUNICATION (SHENZHEN) LTD., Shenzhen (CN)

(72) Inventor: Yuejun Zhu, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 330 days.

(21) Appl. No.: 18/552,910

(22) PCT Filed: Jan. 19, 2022

(86) PCT No.: PCT/CN2022/072636
§ 371 (c)(1),
(2) Date: Sep. 28, 2023

(87) PCT Pub. No.: WO2022/206132
PCT Pub. Date: Oct. 6, 2022

(65) Prior Publication Data
US 2024/0187942 A1 Jun. 6, 2024

(30) Foreign Application Priority Data
Mar. 30, 2021 (CN) .......................... 202110342288.0

(51) Int. Cl.
*H04W 36/00* (2009.01)
*H04W 36/14* (2009.01)
*H04W 36/30* (2009.01)
(52) U.S. Cl.
CPC ... *H04W 36/0083* (2013.01); *H04W 36/1446* (2023.05); *H04W 36/30* (2013.01)

(58) Field of Classification Search
CPC ......... H04W 36/0083; H04W 36/1446; H04W 36/30
See application file for complete search history.

(56) References Cited

U.S. PATENT DOCUMENTS

| | | | | |
|---|---|---|---|---|
| 2021/0136633 A1* | 5/2021 | Zetterlund | ............ | H04W 48/18 |
| 2023/0076600 A1* | 3/2023 | Marupaduga | ..... | H04W 36/0058 |
| 2023/0276336 A1* | 8/2023 | Wu | ..................... | H04W 36/326 |
| | | | | 370/331 |

FOREIGN PATENT DOCUMENTS

| | | |
|---|---|---|
| CN | 102497659 A | 6/2012 |
| CN | 104349411 A | 2/2015 |
| (Continued) | | |

OTHER PUBLICATIONS

International Search Report in International application No. PCT/CN2022/072636,mailed on Apr. 24, 2022.
(Continued)

*Primary Examiner* — Justin Y Lee
(74) *Attorney, Agent, or Firm* — PV IP PC; Wei Te Chung

(57) ABSTRACT
Disclosed in the present application are a network switching method, a storage medium, and an electronic device. The method comprises: when a source signal strength and a target signal strength meet a preset condition, determining a communication network according to a source transmission delay and a target transmission delay; when the signal strength of a source network is poor, a target network can be switched to so as to solve the problem of poor call quality. By comparing the transmission delays of the source network and the target network, the problem of call quality worsening after switching due to the high transmission delay of the target network can be avoided.

16 Claims, 4 Drawing Sheets

(56)          References Cited

FOREIGN PATENT DOCUMENTS

| | | | |
|---|---|---|---|
| CN | 105163355 | A | 12/2015 |
| CN | 107613536 | A | 1/2018 |
| CN | 110913447 | A | 3/2020 |
| CN | 111294870 | A | 6/2020 |
| CN | 111356190 | A | 6/2020 |
| CN | 111526492 | A | 8/2020 |
| CN | 113099497 | A | 7/2021 |
| WO | 2018040103 | A1 | 3/2018 |
| WO | 2018072402 | A1 | 4/2018 |

OTHER PUBLICATIONS

Written Opinion of the International Search Authority in International application No. PCT/CN2022/072636,mailed on Apr. 24, 2022.

Chinese Office Action issued in corresponding Chinese Patent Application No. 202110342288.0 dated Nov. 23, 2021, pp. 1-7.

Notification to Grant Patent Right for Invention issued in corresponding Chinese Patent Application No. 202110342288.0 dated Jul. 4, 2022, pp. 1-4.

\* cited by examiner

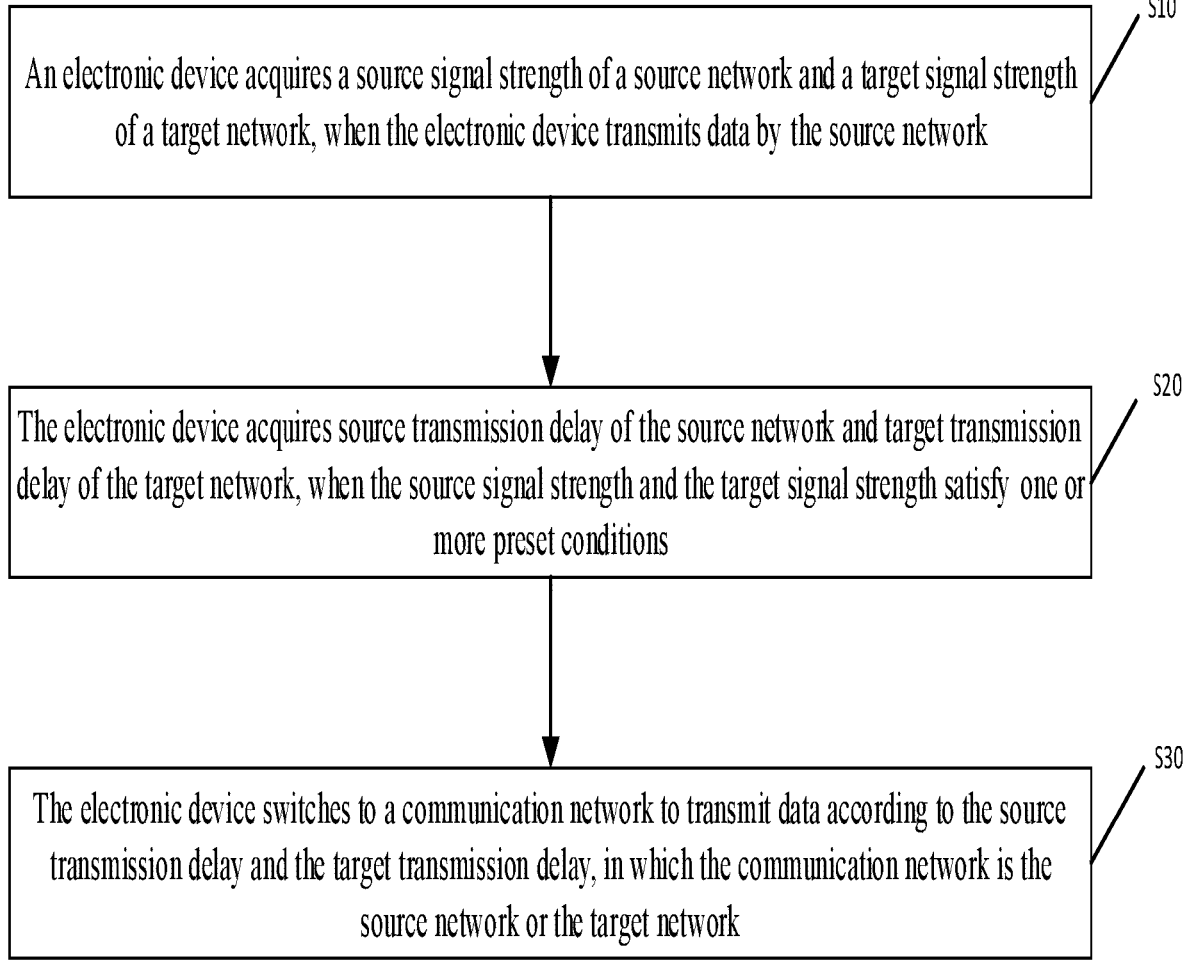

An electronic device acquires a source signal strength of a source network and a target signal strength of a target network, when the electronic device transmits data by the source network — S10

The electronic device acquires source transmission delay of the source network and target transmission delay of the target network, when the source signal strength and the target signal strength satisfy one or more preset conditions — S20

The electronic device switches to a communication network to transmit data according to the source transmission delay and the target transmission delay, in which the communication network is the source network or the target network — S30

NETWORK SWITCHING METHOD, STORAGE MEDIUM AND ELECTRONIC DEVICE

CROSS REFERENCE TO RELATED APPLICATION

This application is a National Stage of International Application No. PCT/CN2022/072636, filed on Jan. 19, 2022, which claims priority to Chinese Application No. 202110342288.0, filed on Mar. 30, 2021, both of which are incorporated by reference herein.

FIELD

The present disclosure generally relates to the field of communication technology, and in particular, to a network switching method, a storage medium, and an electronic device.

BACKGROUND

From 3G, 4G to 5G, mobile phones are getting faster and faster on the Internet. However, for the telecommunication operator, increasing difficulty of network coverage caused by the increasing frequency band used in mobile networks is a problem that telecommunication operators have to face. Especially, the difficulty of indoor deep coverage is higher, which will cause inconvenience to indoor data internet access and voice calls of users.

In order to provide users with a better experience, in existing art, a switching between a wifi network and a mobile network is performed based on the signal strength to ensure better data transmission. For example, when the strength of the wifi signal is less than a set threshold, a switching to the mobile network is performed for data transmission. However, when the signal strength of both the wifi network and the mobile network is poor, a switching between the wifi network and the mobile network cannot improve transmission quality, and may generate "ping-pong effect", that is, the switching between the wifi network and the mobile network is frequently performed, thereby increasing the power consumption of devices.

SUMMARY

According to an aspect of an embodiment of the present disclosure, a network switching method includes:

acquiring, by an electronic device, a source signal strength of a source network and a target signal strength of a target network, when the electronic device transmits data by the source network;

acquiring, by the electronic device, source transmission delay of the source network and target transmission delay of the target network, when the source signal strength and the target signal strength satisfy a preset condition; and switching, according to the source transmission delay and the target transmission delay, by the electronic device, to a communication network to transmit data, in which the communication network is a source network or a target network.

According to the network switching method, the source network is a Volte network or a VoNR network. The target network is a WiFi network. Or, the source network is a WiFi network. The target network is a Volte network or a VoNR network.

According to the network switching method, the method includes:

maintaining, by the electronic device, the source network to transmit data, when the source signal strength and the target signal strength do not satisfy the preset condition, and re-executing the step of acquiring, by the electronic device, the source signal strength of the source network and the target signal strength of the target network after a preset time interval.

According to the network switching method, the preset condition includes a first condition and a second condition.

The first condition: the source signal strength is less than a first strength threshold. A level difference between a strength level of the target signal strength and a strength level of the source signal strength is greater than the first level threshold.

The second condition: the source signal strength is greater than or equal to the first strength threshold and less than a second strength threshold. A level difference between a strength level of the target signal strength and a strength level of the source signal strength is greater than the second level threshold. The second level threshold is greater than the first level threshold.

That the source signal strength and the target signal strength satisfy the preset condition is that the source signal strength and the target signal strength satisfy at least one of the first condition and the second condition.

According to the network switching method, when the source signal strength and the target signal strength satisfy the preset condition, acquiring, by the electronic device, the source transmission delay of the source network and the target transmission delay of the target network particularly includes:

detecting, by the electronic device, whether itself is in a voice call state, when the target signal strength and the source signal strength satisfy the preset condition;

acquiring, by the electronic device, source transmission delay of the source network and target transmission delay of a target network to which the electronic device is connected, when the electronic device is in a voice call state; and switching, by the electronic device, to the target network to transmit data, when the electronic device is not in a voice call state and a first timer of a non-voice call state configured in the electronic device expires.

According to the network switching method, switching, according to the source transmission delay and the target transmission delay, by the electronic device, to a communication network to transmit data particularly includes:

determining a source delay level corresponding to the source transmission delay and a target delay level corresponding to the target transmission delay; and switching, by the electronic device, to the target network to transmit data, when the source delay level is lower than the target delay level.

According to the network switching method, switching, by the electronic device, to the target network transmission data, when the source delay level is lower than the target delay level, particularly includes:

detecting, by the electronic device, whether a second timer of a voice call state configured in itself expires, when the source delay level is lower than the target delay level; and switching, by the electronic device, to the target network to transmit data, when the second timer expires.

According to an aspect of an embodiment of the present disclosure, an electronic device includes a first acquiring module, a second acquiring module, a switching module, a wireless transmission module for transmitting data, and a mobile network module.

The first acquiring module is configured to acquire a source signal strength of a source network and a target signal strength of a target network, when the electronic device transmits data by the source network.

The second acquiring module is configured to acquire source transmission delay of the source network and target transmission delay of the target network when the source signal strength and the target signal strength satisfy a preset condition.

The switching module is configured to switch according to the source transmission delay and the target transmission delay to transmit data by a communication network transmission module. The communication network transmission module is a wireless transmission module or a mobile network module.

According to an aspect of an embodiment of the present disclosure, a computer readable storage medium stores one or more programs which are executable by one or more processors to implement the steps in the network switching method as described above.

According to an aspect of an embodiment of the present disclosure, an electronic device includes a processor, a memory, and a communication bus. A computer readable program executable by the processor is stored on the memory, The communication bus enables connection communication between a processor and a memory.

The processor, when executing the computer readable program, implements the steps in any one of the network switching method as described above.

Compared with existing art, the present disclosure discloses a network switching method, a storage medium, and an electronic device. The method includes: acquiring, by an electronic device, a source signal strength of a source network and a target signal strength of a target network, when the electronic device transmits data by the source network; acquiring, by the electronic device, source transmission delay of the source network and target transmission delay of the target network, when the source signal strength and the target signal strength satisfy a preset condition; and switching, according to the source transmission delay and the target transmission delay, by the electronic device, to a communication network to transmit data. According to some embodiments of the disclosure, when the source signal strength and the target signal strength satisfy the preset condition, the communication network is determined according to the source transmission delay and the target transmission delay, so that the target network can be switched to when signal strength of the source network is poor so as to solve the problem of poor call quality. At the same time, by comparing transmission delay of the source network with transmission delay of the target network, the problem that call quality after switching is poorer due to too high transmission delay of the target network can be prevented.

DESCRIPTION OF DRAWINGS

In order to explain the technical solution in embodiments of the present disclosure more clearly, introduction will now be made briefly to the accompanying drawings required for the description of the embodiments. It will be apparent that the accompanying drawings in the following description are merely some embodiments of the present disclosure. Other accompanying drawings may be obtained based on these accompanying drawings to those skilled in the art without the inventive labor.

FIG. 1 is a flowchart of a network switching method according to some embodiments of the present disclosure.

EMBODIMENTS OF DISCLOSURE

Figure 2:
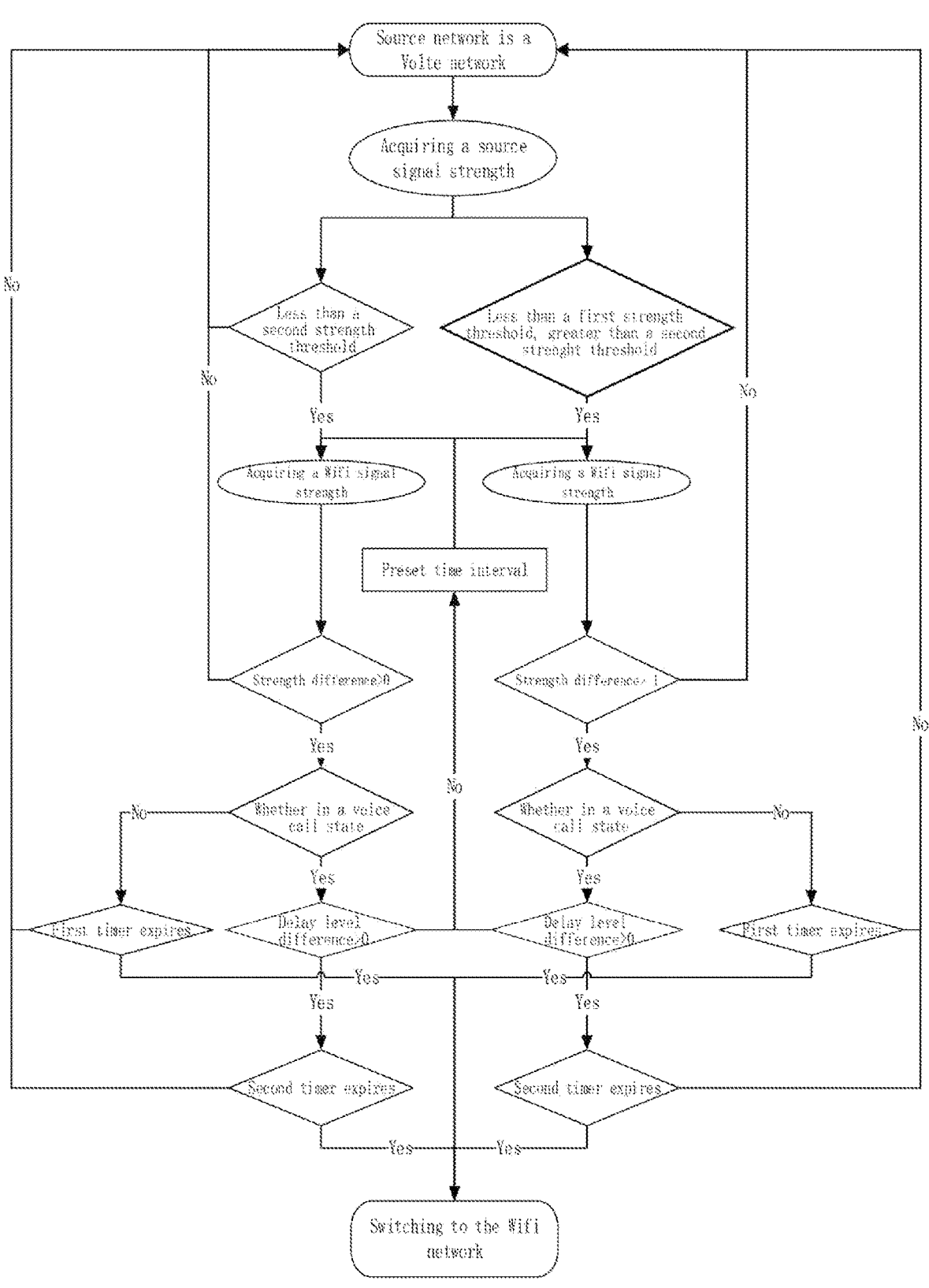
FIG. 2 is a flow chart of switching between a Volte network and a WiFi network as a target network according to an embodiment of the present disclosure.

According to the present disclosure, it is provided a network switching method, a storage medium, and an electronic device. To make objects, technical solutions, and effects of the present disclosure more clear and definitive, further detailed description will be made below to the present disclosure with reference to the accompanying drawings and embodiments. It should be understood that the particular embodiments described herein are merely for illustrating the present disclosure and are not intended to limit the present disclosure.

It can be understood by those skilled in the art that, as used herein, the singular forms "a", "an", "said" and "the" may also include the plural forms unless expressly stated otherwise. It should be further understood that the expression "include" used in the specification of the present disclosure refers to the presence of stated features, integers, steps, operations, elements and/or components, but does not exclude the presence or addition of one or more other features, integers, steps, operations, elements, components and/or groups thereof. It should be understood that when an element is referred to as being "connected" or "coupled" to another element, it may be directly connected or coupled to other elements, or there may also be intermediate elements. In addition, "connected" or "coupled" as used herein may include a wireless connection or a wireless coupling. As used herein, the expression "and/or" includes all or any one unit and all combinations of one or more associated listed items.

Those skilled in the art will appreciate that unless defined otherwise, all terms (including technical term and scientific term) used herein have same meaning as the common understanding of those skilled in the art to which the present disclosure belongs. It should also be understood that terms such as those defined in a general dictionary should be understood to have meanings consistent with the meaning in the context of existing art, and will not be interpreted in idealized or overly formal meanings unless specifically defined as such herein.

In particular implementations, the electronic devices described in embodiments of the present disclosure include, but are not limited to, other portable devices such as a mobile phone, a laptop computer, or a tablet computer having a touch sensitive surface (e.g., a touch display screen and/or a touchpad). It should also be understood that in some embodiments, the electronic device is not a portable communication device, but rather a desktop computer having a touch sensitive surface (e.g., touch display screen and/or touch pad).

In the following discussion, an electronic device including a display and a touch sensitive surface is described. However, it should be understood that the electronic device may also include one or more other physical user interface devices such as a physical keyboard, a mouse, and/or a joystick.

The electronic device supports various applications, such as one or more of a drawing application, a presentation application, a word processing application, a video conference application, a disc burning application, a spreadsheet application, a game application, a telephone application, a video conference application, an e-mail application, an instant messaging application, an exercise support application, a photo management application, a data camera application, a digital camera application, a web browsing application, a digital music player application, and/or a digital video playback application, and the like.

Various applications that may be executed on the electronic device may use at least one common physical user interface device, such as a touch sensitive surface. The first or more functions of the touch sensitive surface and corresponding information displayed on a terminal may be adjusted and/or changed between applications and/or within a corresponding application. In this manner, the common physical framework (e.g., a touch sensitive surface) of the terminal may support various applications having a user interface that is intuitive and transparent to a user.

It should be understood that sequence numbers and sizes of steps in an embodiment do not imply the execution order. The execution order of each process is determined by its function and intrinsic logic, and should not constitute any limitation on the implementation process of embodiments of the present disclosure.

The inventors have found that from 3G, 4G to 5G, mobile phones are getting faster and faster on the Internet. However, for the telecommunication operator, increasing difficulty of network coverage caused by the increasing frequency band used in mobile networks is a problem that telecommunication operators have to face. Especially, the difficulty of indoor deep coverage is higher, which will cause inconvenience to indoor data internet access and voice calls of users. However, with the arrival of the 5G era, VoWiFi (Voice over WiFi), or WiFi Calling service, may be widely applied to voice call services to solve the inconvenience caused by indoor data internet access and voice calls. For example, Zhejiang Mobile has introduced a "WiFi call assistant" application, which enables the user to automatically select and switch to a network with a better signal according to the signal strength of a mobile network and a WiFi network during a call by means of a two-way seamless switching between the Volte and the VoWiFi, providing the user with a Volte call or a VoWiFi call service to improve the call quality.

However, the currently widely used switching mode is generally based on signal strength, and a switching between a wifi network and a mobile network is performed to ensure better data transmission. For example, when the strength of the wifi signal is less than a set threshold, a switching to the mobile network is performed for data transmission. But when the signal strength of both the wifi network and the mobile network is poor, a switching between the wifi network and the mobile network cannot improve transmission quality, and may generate "ping-pong effect", that is, the switching between the wifi network and the mobile network is frequently performed, thereby increasing the power consumption of devices In order to solve above problem, in embodiments of the present disclosure, an electronic device acquires a source signal strength of a source network and a target signal strength of a target network, when the electronic device transmits data by the source network; the electronic device acquires source transmission delay of the source network and target transmission delay of the target network, when the source signal strength and the target signal strength satisfy a preset condition; and according to the source transmission delay and the target transmission delay, the electronic device switches to a communication network to transmit data. According to some embodiments of the disclosure, when the source signal strength and the target signal strength satisfy the preset condition, the communication network is determined according to the source transmission delay and the target transmission delay, so that the target network can be switched to when the signal strength of the source network is poor so as to solve the problem of poor call quality. At the same time, by comparing the transmission delay of the source network with the transmission delay of the target network, the problem that call quality after switching is poorer due to too high transmission delay of the target network can be prevented.

The contents of the present disclosure will be further explained by the description of embodiments with reference to the accompanying drawings.

According to an embodiment, a network switching method, as shown in FIG. 1, includes:

S10. the electronic device acquires a source signal strength of the source network and a target signal strength of the target network, when an electronic device transmits data by a source network.

Figure 3:
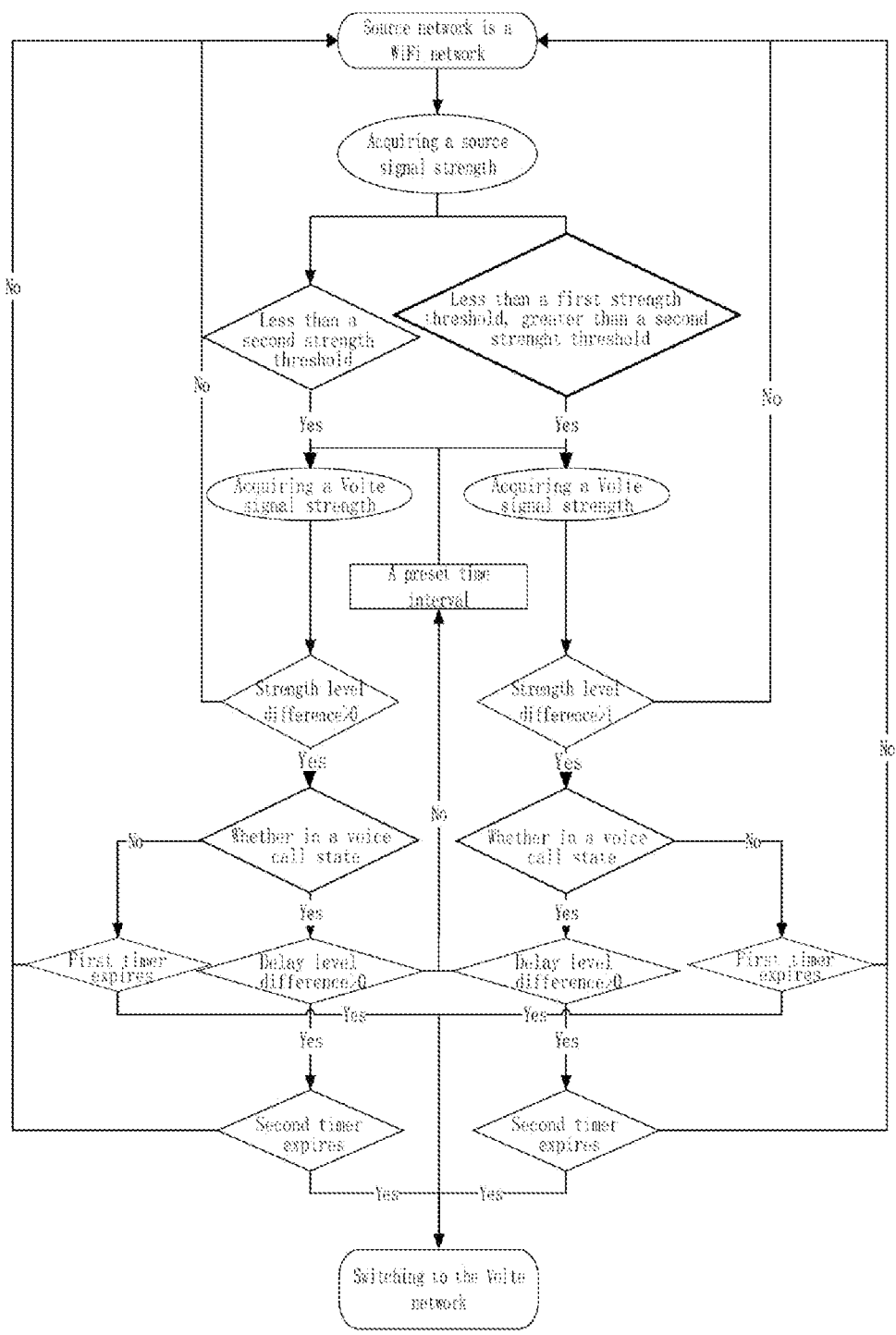
FIG. 3 is a flow chart of switching between a WiFi network and a Volte network as a target network according to an embodiment of the present disclosure.

Particularly, the electronic device accesses an access point of the source network, and transmits a data packet of an application by the source network. For example, the source network is a mobile network. The electronic device accesses the access point of the mobile network, and transmits data by the mobile network. In addition, the electronic device is within the coverage area of the target network, and may perform signal transmission by the target network. In one particular implementation, as shown in FIG. 2, the source network is a Voice over Long-Term Evolution (Volte) network or a Voice over New Radio (VoNR) network, and the target network is a WiFi network. Or, as shown in FIG. 3, the source network is a WiFi network and the target network is a Volte network or a VoNR network. The Volte network refers to a data wireless communication standard facing a mobile phone and a data terminal. It is based on an IP Multimedia Subsystem (IMS) network, and uses on LTE a configuration file specially designed for Control plane and Media plane of voice services, which causes voice services (Control plane and Media plane) to be transmitted as data streams in an LTE data bearer network, without maintaining and relying on conventional circuit-switched voice networks. The radio access technology of 4G is LTE. That the voice is carried on LTE is referred to as Volte. The VoNR network refers to a data wireless communication standard facing a mobile phone and a data terminal, and refers to a global 5G standard of a New Radio design based on downlink frequency division multiplexing OFDM.

In an implementation of an embodiment, that the electronic device acquires the source signal strength of the source network and the target signal strength of the target network, when the electronic device transmits data by the source network, particularly includes:

acquiring the source signal strength of the source network, when the electronic device transmits data by the source network;

acquiring the target signal strength of a target network, when the source signal strength is less than a second strength threshold; and acquiring the source signal strength of the source network periodically or at a number of predetermined times, when the source signal strength is greater than or equal to the second strength threshold.

In particular, the signal strength is used for reflecting signal quality of the source network. The signal quality of the source network affects perceptions of the user using the electronic device. This is because, in a transmission process of a data packet, such as transmission from an electronic device to an application server, a source network connected to the electronic device is passed through. However, when the signal strength of the source network is poor (that is, a network environment of the source network is poor), high data packet transmission delay and packet loss may easily occur, thereby affecting the use of the user. For example, when an electronic device is in an environment with weak signal coverage at an edge of a cell or in an environment with large signal interference, when the electronic device makes a voice call by the source network, a problem of silent, intermittent, or dropped calls may occur, which affects user perception. The source signal strength is used for reflecting the signal quality of the source network, and the target signal strength is used for reflecting the signal quality of the target network. For example, when the source network is a Volte network, the source signal strength is the signal strength of the Volte network, and is used for reflect the signal quality of the Volte network. When the source network is a WiFi network, the source signal strength is the signal strength of the WiFi network, and is used for reflect the signal quality of the WiFi network.

S20. the electronic device acquires source transmission delay of the source network and target transmission delay of the target network, when the source signal strength and the target signal strength satisfy the preset condition.

Particularly, the transmission delay is used for reflecting that when the electronic device is transmitting a data packet, the data packet has end-to-end transmission delay. For example, in a transmission process of a data packet, such as transmission from an electronic device to an application server, a wireless network and a fixed network are usually passed through. The transmission delay of the fixed network is relatively fixed, and the main factor causing the fluctuation of the end-to-end transmission delay of the data packet is the wireless network. The larger the data transmission delay of the wireless network part, the larger the end-to-end transmission delay, and vice versa. Therefore, in an embodiment, in order to facilitate measurement, the end-to-end data transmission delay when the electronic device transmits a data packet of an application by a wireless local area network may be simply equivalent to the data transmission delay of the wireless local area network. Thus, the source transmission delay of the source network may be equivalent to the data transmission delay of the source network. The target transmission delay of the target network may be equivalent to the data transmission delay of the target network. For example, when the source network is a Volte network, the source transmission delay is the transmission delay of the Volte network. When the source network is a VoNR network, the source transmission delay is the transmission delay of the VoNR network. When the target network is a WiFi network, the target transmission delay is the transmission delay of the WiFi network.

In an implementation of an embodiment, the preset condition include:

a first condition: the source signal strength is less than a first strength threshold, and a level difference between a strength level of the target signal strength and a strength level of the source signal strength is greater than the first level threshold; and a second condition: the source signal strength is greater than or equal to the first strength threshold and less than a second strength threshold, and the level difference between the strength level of the target signal strength and the strength level of the source signal strength is greater than the second level threshold, in which the second level threshold is greater than the first level threshold.

Particularly, that the source signal strength and the target signal strength satisfy the preset condition is that the source signal strength and the target signal strength satisfy at least one of the first condition and the second condition. In other words, when the source signal strength and the target signal strength satisfy the first condition, or satisfy the second condition, or satisfy both the first condition and the second condition, the source signal strength and the target signal strength satisfy the preset condition. The first strength threshold and the second strength threshold are both preset.

In addition, the first strength threshold corresponding to the Volte network or the VONR network is due to the signal strength of the Volte network or the VoNR network, and the first strength threshold corresponding to the WiFi network is due to the signal strength of the WiFi network. Thus, after the electronic device acquires the source signal strength of the source network, the first strength threshold corresponding to the source network may be looked up in a preset threshold set according to the source network. For example, the source network is a Volte network, the first strength threshold corresponding to the Volte network is looked up in the threshold set. The threshold set includes a number of key value pairs. Each key value pair in a number of key value pairs takes a network identifier as a key, and takes a strength threshold as a value. For each network identifier, there are two key values corresponding to the network identifier in a number of key value pairs. A value of one key value pair in the two key value pairs is a first strength threshold corresponding to the network identifier, and a value of the other key value pair is a second strength threshold corresponding to the network identifier. For example, the network identifier is a network identifier of the Volte network, the first strength threshold of the Volte network is −105 dBm, and the second strength threshold is −100 dBm. Then the two key value pairs corresponding to the Volte network are <Volte network, −105 dBm> network, and <Volte network, −100 dBm> respectively. For another example, the network identifier is a network identifier of the WiFi network, the first strength threshold of the WiFi network is −80 dBm, and the second strength threshold is −75 dBm. Then the two key value pairs corresponding to the WiFi network are <WiFi network, −80 dBm>, and <WiFi network, −75 dBm>, respectively.

In an implementation of an embodiment, the preset condition may further include:

a third condition: the source signal strength is greater than or equal to the first strength threshold and less than the second strength threshold, the target network is a default communication network, and the level difference between the strength level of the target signal strength and the strength level of the source signal strength is greater than the first level threshold. The default communication network is a preferred communication network configured for an electronic device. In other words, when the electronic device is connected to a number of communication networks, and the network signal strength of a number of communication networks all satisfy the preset condition, the electronic device prioritize using the default communication network to perform data transmission. When the source signal strength is greater than or equal to the first strength threshold and less than the second strength threshold, it indicates that communication quality of the source network is similar to communication quality of the target network. In this case, the default communication network is preferred for data transmission, so that the user's usage habit can be satisfied. Thus, when the source signal strength is greater than or equal to the first strength threshold and less than the second strength threshold, the target network is the default communication network, and the level difference between the strength level of the target signal strength and the strength level of the source signal strength is greater than the first strength threshold, the electronic device switches to the target network to transmit data.

In an implementation of an embodiment, the method further includes:

when the source signal strength and the target signal strength do not satisfy the preset condition, the electronic device maintains the source network to transmit data, and re-executes the step of acquiring, by the electronic device, the source signal strength of the source network and the target signal strength of the target network after a preset time interval.

Particularly, when the source signal strength and the target signal strength do not satisfy the preset condition, it indicates that there is no need to switch the source network used by the electronic device. In other words, when the source signal strength and the target signal strength do not satisfy the preset condition, the electronic device may continue to transmit data by the source network. Thus, the electronic device maintains the source network to transmit data, and may re-execute the step of acquiring, by the electronic device, the source signal strength of the source network and the target signal strength of the target network after a preset time interval, so as to ensure the data transmission efficiency in real time. The preset duration may be 20 s, 30 s, or the like.

In an implementation of an embodiment, when the electronic device transmits data by the source network, the electronic device transmits data using a UDP communication protocol. The data transmission includes a data transmission of a control plane and a data transmission of a user plane, for example, a data transmission process triggered by an application such as a game application, a streaming media, VOIP, and so on. In addition, in practical application, when the reliability requirement of an application for data transmission is lower than a preset requirement threshold, and the application adopts a TCL communication protocol, the communication protocol corresponding to the application may be configured as a UDP communication protocol so as to control data packet forwarding at the transport layer by the UDP communication protocol instead of the TCP communication protocol. The UDP communication protocol is a connectionless-oriented transport layer protocol. A connection does not need to be established in advance when the data packet is sent from a source end to a destination end by the UDP communication protocol.

Based on this, in an implementation, acquiring, by the electronic device, the source transmission delay of the source network and the target transmission delay of the target network to which the electronic device is connected, when the source signal strength and the target signal strength satisfy the preset condition, particularly includes:

acquiring, a communication protocol used by an application which triggers transmission of data, when the electronic device transmits the data by a source network;

acquiring, by the electronic device, source transmission delay of the source network and target transmission delay of the target network to which the electronic device is connected, if the communication protocol is a UDP communication protocol; and switching, by the electronic device, to the target network to transmit data, if the communication protocol is not the UDP communication protocol.

Particularly, when switching to the communication network based on the signal strength and the target signal strength to transmit data, it is possible to switch to the target network directly, and it is also possible to compare the signal strength compared with the target signal strength, and determine the communication network based on the comparison result. For example, when the signal strength is greater than or equal to the target signal strength, the source network is the communication network. When the signal strength is less than the target signal strength, the target network is the communication network. Of course, when the communication protocol is not the UDP communication protocol, it is also possible to determine whether the reliability of the data transmission of the application triggering the data transmission is lower than the reliability threshold. When the reliability is less than the reliability threshold, the UDP communication protocol is used to replace the communication protocol of the application, and the target transmission delay of the target network to which the electronic device is connected is acquired. When the reliability is greater than or equal to the reliability threshold, the electronic device ensures the communication protocol of the application unchanged, and acquires the target signal strength of the target network to which the electronic device is connected.

In an implementation of an embodiment, acquiring, by the electronic device, the source transmission delay of the source network and the target transmission delay of the target network to which the electronic device is connected, when the source signal strength and the target signal strength satisfy the preset condition, particularly includes:

detecting, by the electronic device, whether itself is in a voice call state, when the target signal strength and the source signal strength satisfy the preset condition;

acquiring, by the electronic device, source transmission delay of the source network and target transmission delay of the target network to which the electronic device is connected, when the electronic device is in a voice call state; and switching, by the electronic device, to the target network to transmit data, when the electronic device is not in the voice call state and a first timer of the non-voice call state configured in the electronic device expires.

Particularly, the voice call state may be formed by setting up an IMS voice call. IMS (IP Multimedia Subsystem) is an IP multimedia subsystem and is a brand-new multimedia service form, which can satisfy the requirements of the terminal client for more novel and diversified multimedia services. IMS is considered as the core technology of the next generation network, and is also an important way to approach the integration of mobile and fixed networks, and introduce differentiated services such as triple fusion of voice, data, and video. The IMS voice network is an IMS-based public telephone system. This public telephone system does not refer to the existing circuit interaction network PSTN based on analog technology, but rather to the communication network implementing voice and multimedia based on IMS on a packet switching network.

In an implementation of an embodiment, when the electronic device is not in the voice call state, the first timer of the non-voice call state configured in the electronic device is monitored whether the first timer expires. When the first timer expires, the target network is switched to for transmitting data. In other words, the signal strength is taken as the switching basis of the source network and the target network. When the source signal strength and the target signal strength do not satisfy the preset condition, the network switching is not performed. When the source signal strength and the target signal strength satisfy the preset condition and the time interval between the last switching reaches a preset time, the data is transmitted to the target network. The preset time is a timing time configured by the first timer to trigger the switching operation by the first timer.

S30. The electronic device switches to the communication network to transmit data according to the source transmission delay and the target transmission delay.

Particularly, the communication network is a network for transmitting data determined based on the source transmission delay and the target transmission delay. The communication network may be the source network or the target network. When the communication network is the source network, it indicates that the electronic device has not performed a network switching. When the communication network is the target network, it indicates that the electronic device performs the network switching.

In an implementation of an embodiment, switching, by the electronic device, to the communication network to transmit data according to the source transmission delay and the target transmission delay particularly includes:

determining a source delay level corresponding to the source transmission delay and a target delay level corresponding to the target transmission delay; and switching, by the electronic device, to the target network to transmit data, when the source delay level is lower than the target delay level.

Particularly, the source network preconfigures a number of first delay levels. The target network preconfigures a number of second delay levels. After the source transmission delay and the target transmission delay are acquired, the source delay level to which the source transmission delay belongs is selected from a number of first delay levels according to the source transmission delay, and the target delay level is selected from a number of second delay levels according to the target transmission delay. After the source delay level and the target delay level are acquired, the source delay level is compared with the target delay level. If the source delay level is lower than the target delay level, the target network is switched to for transmitting data. if the source delay level is higher than or equal to the target delay level, the source network is maintained to transmit data, and the step of acquiring, by the electronic device, the source signal strength of the source network and the target signal strength of the target network is re-executed after a preset time interval.

In addition, the preset time may be preset as a restriction condition of the step of acquiring, by the electronic device, the source signal strength of the source network and the target signal strength of the target network. The preset time may be used as a timer. When the timer expires, the electronic device acquires the source signal strength of the source network and the target signal strength of the target network, to facilitate switching to the target network when the target delay level of the target network is lower than the source delay level of the source network, so as to improve the voice call quality. In addition, the latest data is generated every 5 s due to the transmission delay, thus the preset time may be set to be longer than 5 seconds, so that the current target network delay can be checked again. For example, the preset time is 6 seconds, 7 seconds, etc.

In an implementation of an embodiment, switching, by the electronic device, to the target network to transmit data, when the source delay level is lower than the target delay level, particularly includes:

detecting, by the electronic device, whether a second timer of the voice call state configured in the electronic device itself expires, when the source delay level is lower than the target delay level; and switching, by the electronic device, to the target network to transmit data, when the second timer expires.

Particularly, timing time configured by the second timer is smaller than timing time configured by the first timer, so that a short preset time interval is set in the call state, preventing the call drop. This is because the signal attenuates fast when moving on the WiFi edge, and the signal quality may rapidly decrease within the interval preset time, thereby easily causing the call drop. Setting a short preset time interval in a non-call state will not cause the problem of the call drop and can also reduce a ping-pong switching.

In summary, according to an embodiment, a network switching method includes acquiring, by an electronic device, source transmission delay of a source network when the electronic device transmits data by the source network; acquiring, by the electronic device, target transmission delay of a target network to which the electronic device is connected, when the source transmission delay is less than a first strength threshold corresponding to the source network; switching, by the electronic device, to a communication network to transmit data according to source transmission delay and target transmission delay, in which the communication network is the source network or the target network. According to the present disclosure, when signal strength of the source network is lower than a first strength threshold, the communication network is determined according to the transmission delay of the source network and the transmission delay of the target network, so that the target network can be switched to when the signal strength of the source network is poor so as to solve the problem of poor call quality. At the same time, by comparing the transmission delay of the source network with the transmission delay of the target network, the problem that call quality after switching is poorer due to too high transmission delay of the target network can be prevented.

Figure 4:
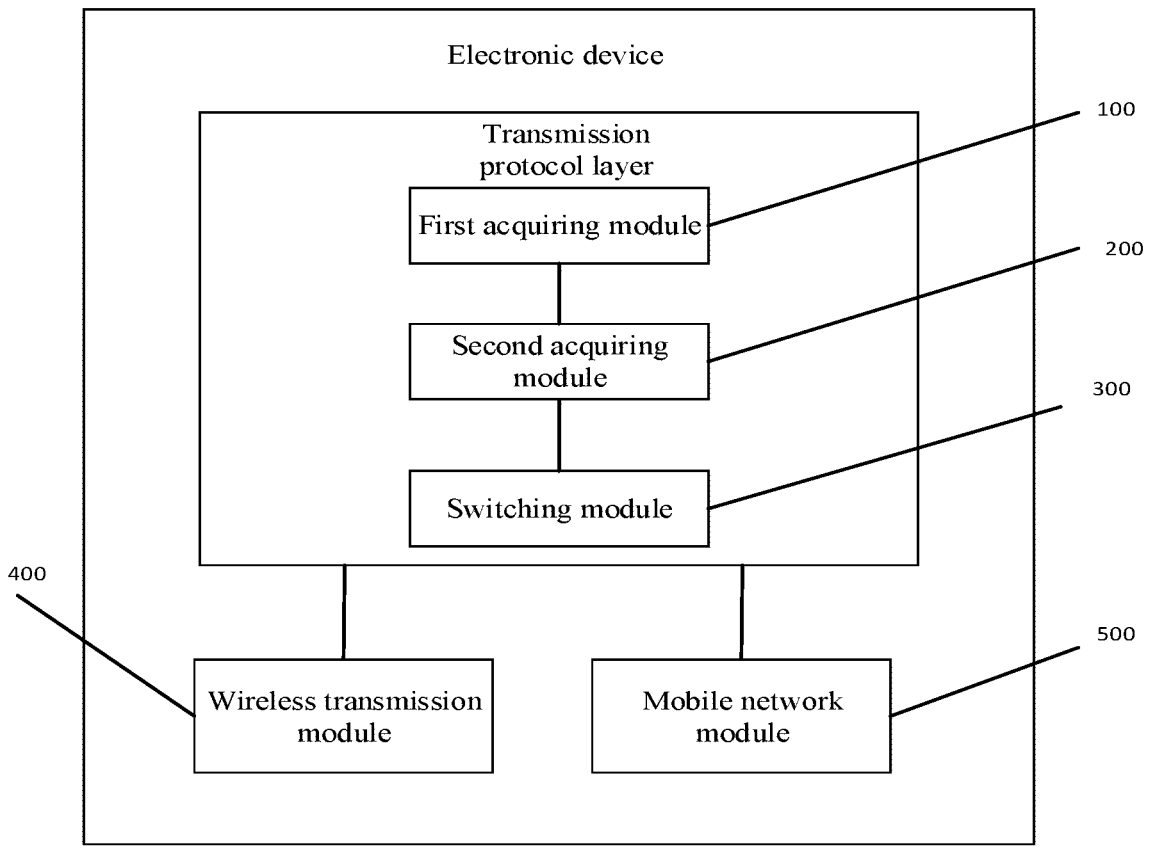
FIG. 4 is a structural schematic diagram of an electronic device according to an embodiment of the present disclosure.

Based on the above network switching method, according an embodiment, as shown in FIG. 4, an electronic device includes a first acquiring module 100, a second acquiring module 200, a switching module 300, a wireless transmission module 400 for transmitting data, and a mobile network module 500.

The first acquiring module 100 is configured to acquire source signal strength of a source network and a target signal strength of a target network when the electronic device transmits data by the source network.

The second acquiring module 200 is configured to acquire source transmission delay of the source network and target transmission delay of the target network to which the electronic device is connected when the source signal strength and the target signal strength satisfy a preset condition.

The switching module 300 is configured to according to the source transmission delay and the target transmission delay, switch to transmit data by the communication network transmission module. The communication network transmission module is the wireless transmission module 400 or the mobile network module 500.

In an implementation, the source network is a Volte network or a VoNR network. The target network is a WiFi network. Or, the source network is a WiFi network. The target network is a Volte network or a VoNR network.

In an implementation, the electronic device further includes a maintaining module.

The maintaining module is configured to: maintain, by the electronic device, the source network to transmit data, when the source signal strength and the target signal strength do not satisfy the preset condition and re-execute the step of acquiring, by the electronic device, the source signal strength of the source network and the target signal strength of the target network after a preset time interval.

In an implementation, the preset condition includes a first condition and a second condition.

The first condition: the source signal strength is less than a first strength threshold, and a level difference between a strength level of the target signal strength and a strength level of the source signal strength is greater than the first level threshold.

The second condition: the source signal strength is greater than or equal to the first strength threshold and less than the second strength threshold, and a level difference between the strength level of the target signal strength and the strength level of the source signal strength is greater than the second level threshold. The second level threshold is greater than the first level threshold.

That the source signal strength and the target signal strength satisfy the preset condition is that the source signal strength and the target signal strength satisfy at least one of the first condition and the second condition.

In an implementation, the second acquisition module is particularly configured to:

detect, by the electronic device, whether the electronic device itself is in a voice call state, when the target signal strength and the source signal strength satisfy the preset condition;

acquire, by the electronic device, first transmission delay of the source network and second transmission delay of the target network to which the electronic device is connected, when the electronic device is in a voice call state; and switch, by the electronic device, to the target network to transmit data, when the electronic device is not in the voice call state and a first timer of a non-voice call state configured in the electronic device expires.

In an implementation, the switching module is particularly configured to:

determine a first delay level corresponding to the first transmission delay and a second delay level corresponding to the second transmission delay; and switch, by the electronic device, to the target network to transmit data, when the first delay level is lower than the second delay level.

In an implementation, the switching module is particularly configured to:

detect, by the electronic device, whether a second timer of the voice call state configured in the electronic device itself expires, when the first delay level is lower than the second delay level; and switch, by the electronic device, to the target network to transmit data, when the second timer expires.

In addition, it is worth noting that the operation process of each functional module of the electronic device according to an embodiment is same as the operation process of the network switching method described above, and details are not described herein. For details, reference may be made to the description of the network switching method.

Based on the above-described network switching method, according to an embodiment, a computer-readable storage medium stores one or more programs. The one or more programs can be executed by one or more processors to implement the steps in the network switching method according to above-described embodiments.

Figure 5:
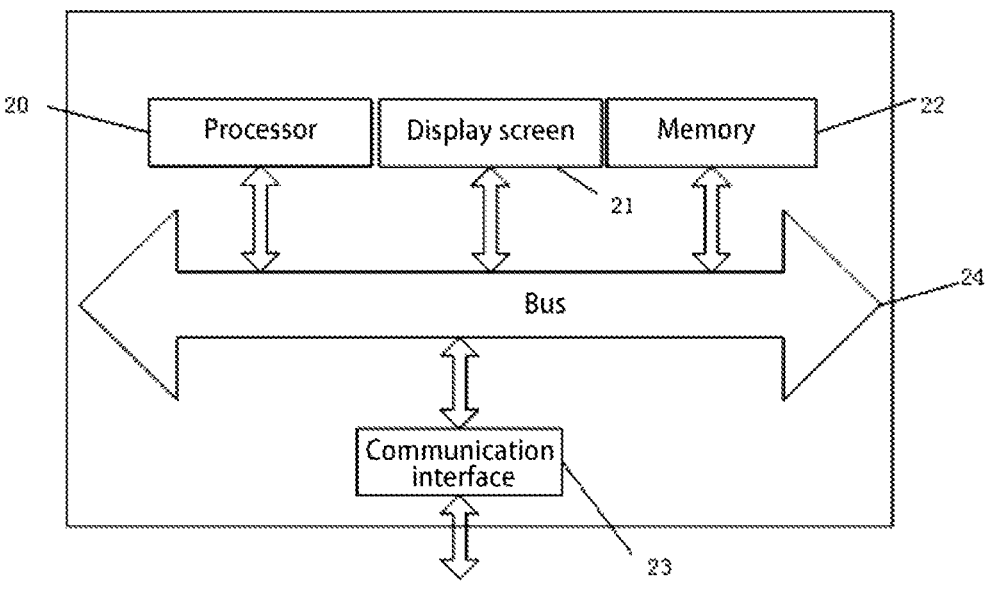
FIG. 5 is a structural schematic diagram of an electronic device according to an embodiment of the present disclosure.

Based on the above-described network switching method, according to the present disclosure, as shown in FIG. 5, an electronic device includes at least one processor 20; a display screen 21; and a memory 22. The electronic device may also include a communication interface 23 and a bus 24. The processor 20, the display screen 21, the memory 22 and the communication interface 23 may complete communications between each other by the bus 24. The display screen 21 is configured to display a user guide interface preset in an initial setting mode. The communication interface 23 may transmit information. The processor 20 may invoke logical instructions in the memory 22 to execute the method in the above-described embodiments.

In addition, the logic instructions in the memory 22 described above may be implemented in the form of software functional units and may be stored in a computer-readable storage medium when sold or used as separate products.

The memory 22, as a computer-readable storage medium, may be configured to store software programs and computer-executable programs, such as program instructions or modules corresponding to the methods in embodiments of the present disclosure. The processor 20 executes a functional application and data processing by running a software program, instruction or module stored in the memory 22, that is, implements the method in the above-described embodiment.

The memory 22 may include a storage program area and a storage data area. The storage program area may store an operating system, an application required for at least one function. The storage data area may store data or the like created according to use of the electronic device. In addition, the memory 22 may include a high-speed random access memory, and may also include a non-volatile memory. For example, a U disk, a removable hard disk, a Read-Only Memory (ROM), a Random Access Memory, RAM, a magnetic disk, an optical disk, or any medium in which program code can be stored, and can also may be a transient storage medium.

Further, the particular process of loading and executing multiple instructions in the above-described storage medium and the electronic device by a processor has been described in detail in the above-described method, which will not be described herein again.

Finally, it should be noted that the above embodiments are merely illustrative of the technical solutions of the present disclosure and are not intended to be limiting thereof. Although the present disclosure has been described in detail with reference to the foregoing embodiments, those skilled in the art should understand that modifications may still be made to the technical solutions described in the foregoing embodiments, or equivalently substitute some of the technical features thereof. These modifications or substitutions do not make the essence of the present disclosure depart from the spirit and scope of embodiments of the present disclosure.

What is claimed is:

1. A network switching method, comprising:

acquiring, by an electronic device, a source signal strength of a source network and a target signal strength of a target network, when the electronic device transmits data by the source network;

acquiring, by the electronic device, source transmission delay of the source network and target transmission delay of the target network, when the source signal strength and the target signal strength satisfy a preset condition; and switching, according to the source transmission delay and the target transmission delay, by the electronic device, to a communication network to transmit data, wherein the communication network is the source network or the target network, wherein the preset condition comprises:

a first condition: the source signal strength is less than a first strength threshold, and a level difference between a strength level of the target signal strength and a strength level of the source signal strength is greater than a first level threshold; and a second condition: the source signal strength is greater than or equal to the first strength threshold and less than the second strength threshold, and the level difference between the strength level of the target signal strength and the strength level of the source signal strength is greater than a second level threshold, wherein the second level threshold is greater than the first level threshold, wherein the source signal strength and the target signal strength satisfying the preset condition includes: the source signal strength and the target signal strength satisfying at least one of the first condition and the second condition.

2. The network switching method according to claim 1, wherein the source network is a Volte network or a VoNR network, and the target network is a WiFi network; or, the source network is a WiFi network, and the target network is a Volte network or a VoNR network.

3. The network switching method according to claim 1, wherein the method comprises: maintaining, by the electronic device, the source network to transmit data, when the source signal strength and the target signal strength do not satisfy the preset condition; and re-executing a step of acquiring, by the electronic device, the source signal strength of the source network and the target signal strength of the target network after a preset time interval.

4. The network switching method according to claim 1, wherein the preset condition further comprises:

a third condition: the source signal strength is greater than or equal to the first strength threshold and less than the second strength threshold, the target network is a default communication network, and the level difference between the strength level of the target signal strength and the strength level of the source signal strength is greater than the first level threshold.

5. The network switching method according to claim 1, wherein before the acquiring, by the electronic device, the source transmission delay of the source network and the target transmission delay of the target network, when the source signal strength and the target signal strength satisfy the preset condition, the method further comprises:

querying, by the electronic device, a first strength threshold and a second strength threshold corresponding to the source network from a threshold set according to a network identity of the source network, wherein the threshold set comprises a plurality of key value pairs, wherein in the key value pairs, the network identity is used as a key, and the first strength threshold and the second strength threshold are used as values corresponding to the key.

6. The network switching method according to claim 1, wherein the acquiring, by the electronic device, the source transmission delay of the source network and the target transmission delay of the target network, when the source signal strength and the target signal strength satisfy the preset condition, comprises:

acquiring a communication protocol used by an application triggering a data transmission, when the electronic device transmits data by the source network; and acquiring, by the electronic device, the source transmission delay of the source network and the target transmission delay of the target network connected to the electronic device, when the communication protocol is a UDP communication protocol.

7. The network switching method according to claim 6, wherein after the switching, according to the source transmission delay and the target transmission delay, by the electronic device, to the communication network to transmit data, the method further comprises:

switching, by the electronic device, to the target network to transmit data, when the communication protocol is not the UDP communication protocol.

8. The network switching method according to claim 1, wherein the acquiring, by the electronic device, the source transmission delay of the source network and the target transmission delay of the target network, when the source signal strength and the target signal strength satisfy the preset condition, particularly comprises:

detecting, by the electronic device, whether itself is in a voice call state, when the target signal strength and the source signal strength satisfy the preset condition;

acquiring, by the electronic device, the source transmission delay of the source network and the target transmission delay of the target network connected to the electronic device, when the electronic device is in the voice call state;

switching, by the electronic device, to the target network to transmit data, when the electronic device is not in the voice call state and a first timer of a non-voice call state configured in the electronic device expires.

9. The network switching method according to claim 1, wherein the switching, according to the source transmission delay and the target transmission delay, by the electronic device, to the communication network to transmit data particularly comprises:

determining a source delay level corresponding to the source transmission delay and a target delay level corresponding to the target transmission delay; and switching, by the electronic device, to the target network to transmit data, when the source delay level is lower than the target delay level.

10. The network switching method according to claim 9, wherein the switching, by the electronic device, to the target network to transmit data, when the source delay level is lower than the target delay level particularly comprises:

detecting, by the electronic device, whether a second timer of a voice call state configured in itself expires, when the source delay level is lower than the target delay level; and switching, by the electronic device, to the target network to transmit data, when the second timer expires.

11. The network switching method according to claim 9, further comprising:

maintaining the source network to transmit data under a condition that the source delay level is higher than or equal to the target delay level; and returning to execute the acquiring, by the electronic device, the source signal strength of the source network and the target signal strength of the target network after a preset time interval.

12. An electronic device, comprising a first acquiring module; a second acquiring module; a switching module; a wireless transmission module configured to transmit data; and a mobile network module, wherein the first acquiring module is configured to acquire a source signal strength of a source network and a target signal strength of a target network when the electronic device transmits data by the source network;

the second acquiring module is configured to acquire source transmission delay of the source network and target transmission delay of the target network when the source signal strength and the target signal strength satisfy s preset condition; and the switching module is configured to according to the source transmission delay and the target transmission delay, switch to transmit data by a communication network transmission module, wherein the communication network transmission module is a wireless transmission module or a mobile network module, wherein the preset condition comprises:

a first condition: the source signal strength is less than a first strength threshold, and a level difference between a strength level of the target signal strength and a strength level of the source signal strength is greater than a first level threshold; and a second condition: the source signal strength is greater than or equal to the first strength threshold and less than the second strength threshold, and the level difference between the strength level of the target signal strength and the strength level of the source signal strength is greater than a second level threshold, wherein the second level threshold is greater than the first level threshold, wherein the source signal strength and the target signal strength satisfying the preset condition includes: the source signal strength and the target signal strength satisfying at least one of the first condition and the second condition.

13. The electronic device of claim 12, further comprising a maintaining module;

wherein the holding module is configured to maintain, by the electronic device, the source network to transmit data, when the source signal strength and the target signal strength do not satisfy the preset condition, and re-execute a step of acquiring, by the electronic device, the source signal strength of the source network and the target signal strength of the target network, after a preset time interval.

14. The electronic device according to claim 12, wherein the source network is a Volte network or a VoNR network, and the target network is a WiFi network; or, the source network is a WiFi network, and the target network is a Volte network or a VoNR network.

15. The electronic device according to claim 12, wherein the preset condition further comprises:

a third condition: the source signal strength is greater than or equal to the first strength threshold and less than the second strength threshold, the target network is a default communication network, and a level difference between the strength level of the target signal strength and the strength level of the source signal strength is greater than the first level threshold.

16. A computer-readable storage medium, storing one or more programs, wherein the one or more programs are executable by one or more processors to implement steps in a network switching method, wherein the network switching method comprises:

acquiring a source signal strength of a source network and a target signal strength of a target network, when the electronic device transmits data by the source network;

acquiring source transmission delay of the source network and target transmission delay of the target network, when the source signal strength and the target signal strength satisfy a preset condition; and switching, according to the source transmission delay and the target transmission delay, to a communication network to transmit data, wherein the communication network is the source network or the target network, wherein the preset condition comprises:

a first condition: the source signal strength is less than a first strength threshold, and a level difference between a strength level of the target signal strength and a strength level of the source signal strength is greater than a first level threshold; and a second condition: the source signal strength is greater than or equal to the first strength threshold and less than the second strength threshold, and the level difference between the strength level of the target signal strength and the strength level of the source signal strength is greater than a second level threshold, wherein the second level threshold is greater than the first level threshold, wherein the source signal strength and the target signal strength satisfying the preset condition includes: the source signal strength and the target signal strength satisfying at least one of the first condition and the second condition.

* * * * *